(12) United States Patent
Lee et al.

(10) Patent No.: US 9,315,253 B2
(45) Date of Patent: Apr. 19, 2016

(54) DRAIN MASTS

(71) Applicant: Goodrich Corporation, Charlotte, NC (US)

(72) Inventors: Charles A. Lee, Akron, OH (US); Kyle H. Deiwert, Uniontown, OH (US); Michael J. Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 96 days.

(21) Appl. No.: 14/178,463

(22) Filed: Feb. 12, 2014

(65) Prior Publication Data

US 2015/0075662 A1 Mar. 19, 2015

Related U.S. Application Data

(60) Provisional application No. 61/879,449, filed on Sep. 18, 2013.

(51) Int. Cl.
*B64D 1/00* (2006.01)
*B64C 1/14* (2006.01)

(52) U.S. Cl.
CPC ......... *B64C 1/1453* (2013.01); *Y10T 29/49826* (2015.01); *Y10T 137/6906* (2015.04)

(58) Field of Classification Search
None
See application file for complete search history.

(56) References Cited

U.S. PATENT DOCUMENTS

| | | | | |
|---|---|---|---|---|
| 1,784,157 A | * | 12/1930 | Oglesby et al. | 239/171 |
| 2,325,018 A | * | 7/1943 | Moss | 73/861.68 |
| 2,408,774 A | * | 10/1946 | Goddard et al. | 239/171 |
| 2,428,585 A | * | 10/1947 | Rogers | 244/129.1 |
| 3,535,930 A | * | 10/1970 | Rees | 73/861.68 |
| 4,354,648 A | * | 10/1982 | Schenk et al. | 244/200.1 |
| 4,364,517 A | * | 12/1982 | Etheridge et al. | 239/171 |
| 4,437,487 A | * | 3/1984 | Marmon | 137/322 |
| 4,715,561 A | * | 12/1987 | Spinosa et al. | 244/129.1 |
| 5,290,996 A | * | 3/1994 | Giamati et al. | 219/201 |
| 5,552,576 A | * | 9/1996 | Giamati | 219/201 |
| 5,655,732 A | * | 8/1997 | Frank | 244/1 R |
| 5,996,938 A | * | 12/1999 | Simonetti | 244/129.1 |
| 6,211,494 B1 | * | 4/2001 | Giamati et al. | 219/482 |
| 6,425,554 B1 | * | 7/2002 | Moreland | 244/136 |
| 6,435,452 B1 | * | 8/2002 | Jones | 244/1 A |
| 6,776,183 B1 | * | 8/2004 | Brooker et al. | 137/216 |
| 7,097,131 B2 | * | 8/2006 | Palmer et al. | 244/1 A |
| 7,121,512 B2 | * | 10/2006 | Bonnaud | 244/136 |
| 7,546,981 B2 | * | 6/2009 | Hoffjann et al. | 244/136 |
| 7,731,127 B2 | * | 6/2010 | Hoffjann et al. | 244/136 |
| 8,602,353 B2 | * | 12/2013 | Lindauer et al. | 244/118.5 |
| 2004/0146339 A1 | * | 7/2004 | Lutzer | 403/226 |
| 2005/0230547 A1 | * | 10/2005 | Giamati et al. | 244/129.1 |
| 2006/0249628 A1 | * | 11/2006 | Turner et al. | 244/136 |

(Continued)

FOREIGN PATENT DOCUMENTS

DE 10301374 A1 8/2004

*Primary Examiner* — Medhat Badawi
(74) *Attorney, Agent, or Firm* — Locke Lord LLP; Scott D. Wofsy; Joshua L. Jones

(57) ABSTRACT

A drain mast includes a first fairing body defining a first fairing wall and a first drain portion. A second fairing body defines a second fairing wall and a second drain portion. The first and second fairing bodies are joined together as a fairing with the first and second fairing walls as opposed exterior fairing walls, and with the first and second drain portions joined to form a drain passage through the fairing from a drain passage inlet to a drain passage outlet.

13 Claims, 4 Drawing Sheets

(56) References Cited

U.S. PATENT DOCUMENTS

2011/0121137 A1* 5/2011 Sandiford ............... 244/136
2012/0286095 A1* 11/2012 Giamati ................. 244/136
2012/0305553 A1* 12/2012 Brotzell et al. .......... 220/23.83
2013/0193271 A1* 8/2013 Otero et al. ............. 244/136
2015/0021438 A1* 1/2015 Casado Montero et al. .. 244/136

* cited by examiner

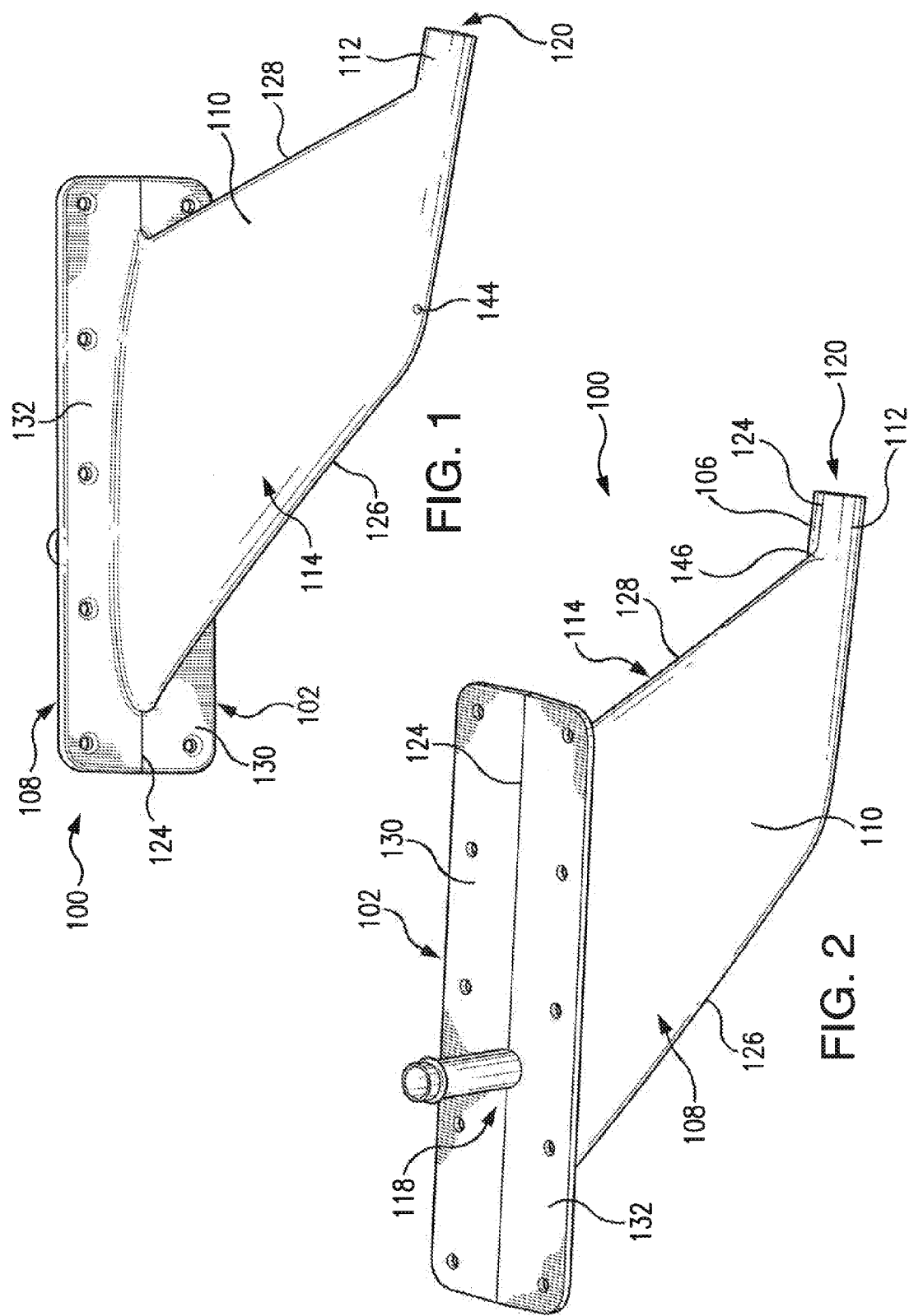

DRAIN MASTS

CROSS-REFERENCE TO RELATED APPLICATIONS

This application claims the benefit of priority to U.S. Provisional Patent Application No. No. 61/879,449 filed Sep. 18, 2013 which is incorporated by reference herein in its entirety.

BACKGROUND OF THE INVENTION

1. Field of the Invention

The present disclosure relates to drains, and more particularly to drain masts such as used to drain liquids from within an aircraft to the exterior of the aircraft.

2. Description of Related Art

An aircraft drain mast whether for water, fuel, or other liquids, protrudes from the fuselage into the airstream far enough that the discharged media is cleanly swept away such that it does not reattach to the aircraft. For example, a drain mast can be used to drain condensation and/or fuel leakage from the inner to outer tube gap in a double walled fuel line. The geometry and size of the drain mast, e.g., height, width, length and airfoil shape, contribute to drag components, which are items to be minimized for maximizing fuel consumption and range. Many conventional drain masts are built with full length tubes and can require significant efforts to repair a damaged tube, such as dismantling the mast with subsequent reassembly, repainting and retesting.

Such conventional methods and systems have generally been considered satisfactory for their intended purpose. However, there is still a need in the art for improved drain masts and methods of making drain masts. The present disclosure provides a solution for these problems.

SUMMARY OF THE INVENTION

A drain mast includes a first fairing body defining a first fairing wall and a first drain portion. A second fairing body defines a second fairing wall and a second drain portion. The first and second fairing bodies are joined together as a fairing with the first and second fairing walls as opposed exterior fairing walls, and with the first and second drain portions joined to form a drain passage through the fairing from a drain passage inlet to a drain passage outlet.

In accordance with certain embodiments, the first drain portion includes a first drain channel, the second drain portion includes a second drain channel, and the first and second drain channels are joined defining the drain passage therebetween. The opposed exterior fairing walls can define an airfoil from a leading edge of the fairing to a trailing edge of the fairing, and the opposed exterior fairing walls can be joined to one another at a seam along the leading and trailing edges of the fairing. An inlet nipple can be connected in fluid communication with the drain passage inlet. The first fairing body can include a first mounting flange portion, the second fairing body can include a second mounting flange portion, and the first and second mounting flange portions can be joined together as a mounting flange surrounding the drain passage inlet for mounting the fairing to an aircraft.

It is contemplated that the first and second fairing bodies can be substantially symmetrical across a plane defined by a seam where the first and second fairing bodies are joined together. The first and second fairing bodies can be non-metallic, e.g. fiberglass, and can be joined together by an adhesive, e.g., epoxy. A portion of the first fairing body can include a groove, and a portion of the second fairing body can include a tongue engaged with the groove of the first fairing body.

In certain embodiments, the fairing defines opposed leading and tailing edges, wherein a first void is defined within the fairing between the drain passage and the leading edge, and wherein a second void is defined within the fairing between the drain passage and the trailing edge. The first void can be in fluid communication with a space exterior to the fairing through a vent defined in the fairing. Similarly, the second void can be in fluid communication with a space exterior to the fairing through a vent defined in the fairing.

A method of making a drain mast includes joining a first fairing body as described above to a second fairing body as described above to form a fairing. The method can further include joining an inlet nipple to the fairing in fluid communication with the drain passage inlet. Joining the first fairing body to the second fairing body can include applying an adhesive to at least one of the first and second drain portions, and adhering the first and second fairing bodies together with the adhesive.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a drain mast constructed in accordance with the present disclosure, showing the drain passage outlet of the drain mast fairing;

FIG. 2 is a perspective view of the drain mast of FIG. 1, showing the inlet nipple joined to the drain passage inlet;

DETAILED DESCRIPTION OF THE PREFERRED EMBODIMENTS

Figure 3:
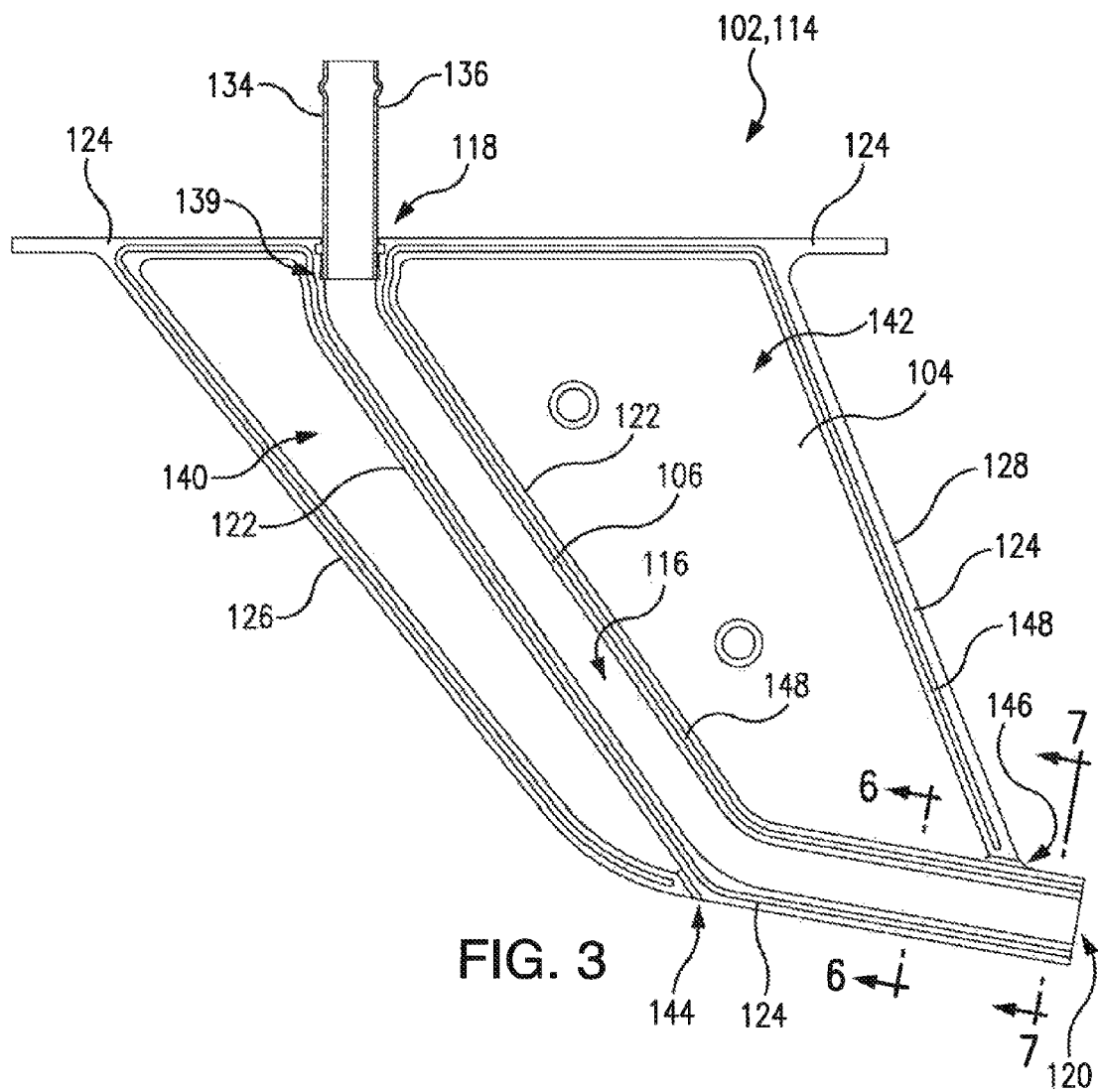
FIG. 3 is a side elevation view of a first fairing body of the fairing of FIG. 1, showing the interior of the fairing including the first portion of the drain passage, with the second fairing body removed.

Reference will now be made to the drawings wherein like reference numerals identify similar structural features or aspects of the subject disclosure. For purposes of explanation and illustration, and not limitation, a partial view of an exemplary embodiment of drain mast in accordance with the disclosure is shown in FIG. 1 and is designated generally by reference character 100. Other embodiments of drain masts in accordance with the disclosure, or aspects thereof, are provided in FIGS. 2-7, as will be described. The systems and methods described herein can be used to provide improved drain masts, for example in aerospace applications.

Drain mast 100 includes a first fairing body 102 defining a first fairing wall 104 and a first drain portion 106 (first fairing wall 104 and first drain portion 106 are identified in FIG. 3). A second fairing body 108 defines a second fairing wall 110 and a second drain portion 112. Referring to FIG. 2, the first and second fairing bodies 102 and 108 are joined together as a fairing 114 with the first and second fairing walls 104 and 110 forming opposed exterior fairing walls, and with the first and second drain portions 106 and 112 joined to form a drain passage 116 (indicated in FIG. 3) through the fairing from a drain passage inlet 118 to a drain passage outlet 120.

First and second fairing bodies 102 and 108 are substantially symmetrical across a plane defined by a seam 124 where the first and second fairing bodies are joined together. Various portions of seam 124 are indicated in each of FIGS. 1-3. The opposed exterior fairing walls, i.e., first and second fairing walls 104 and 110, define an airfoil from a leading edge 126 of fairing 114 to a trailing edge 128 of fairing 114. Seam 124 includes portions where the opposed exterior fairing walls are joined to one another along the leading and trailing edges 126 and 128 of fairing 114. First fairing body 102 includes a first mounting flange portion 130, and second fairing body 108 includes a second mounting flange portion 132. First and second mounting flange portions 130 and 132 are joined together as a mounting flange surrounding the drain passage inlet 118, and can be used for mounting the fairing to an aircraft, for example using fasteners in the holes shown in the mounting flange portions 130 and 132 in FIGS. 1 and 2.

With reference now to FIG. 3, first fairing body 102 is shown without second fairing body 108 to show the internal structure. First drain portion 106 includes a first drain channel defined by the sidewalls 122 of first drain portion 106, and the bottom of the channel which includes the portion of first fairing wall 104 between the sidewalls 122. Second drain portion 112 includes a second drain channel with the same general channel structure, but in mirrored symmetry, as shown in FIG. 3 for first drain portion 106. When joined together as shown in FIGS. 1 and 2, the first and second drain channels are joined to define the complete drain passage 116 therebetween. Unlike conventional designs where the drain is provided as a separate pipe assembled into a fairing, the drain passage 116 is formed integral with the fairing walls when the first and second fairing portions 102 and 108 are joined together.

Figure 4:
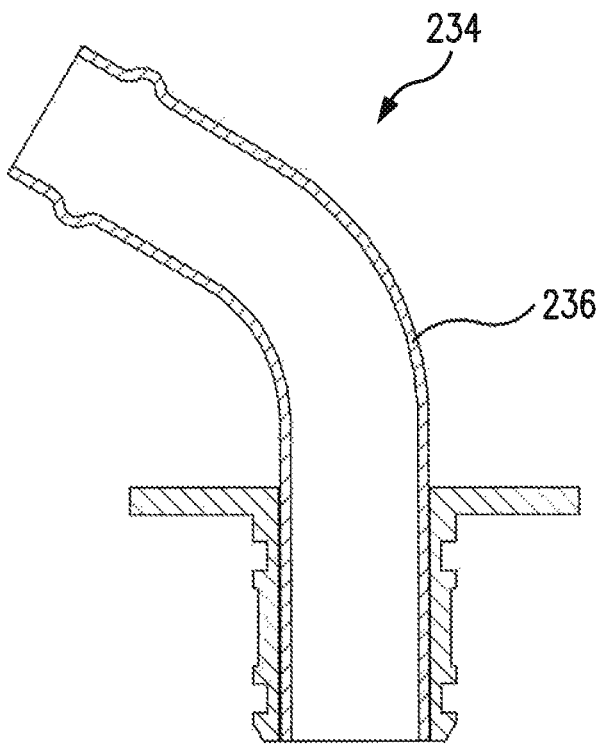
FIG. 4 is a cross-sectional side elevation view of another exemplary embodiment of an inlet nipple for use with the drain mast of FIG. 1, showing an angled conduit.
Figure 5:
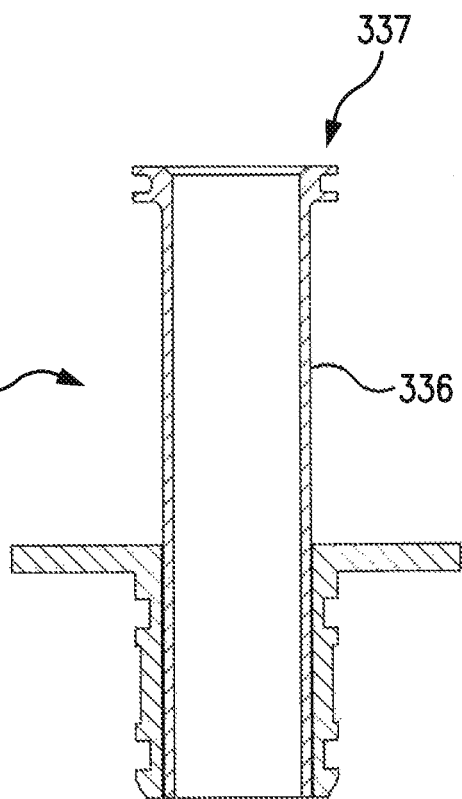
FIG. 5 is a cross-sectional side elevation view of another exemplary embodiment of an inlet nipple for use with the drain mast of FIG. 1, showing a conduit with seal members at the inlet end thereof.
Figure 8:
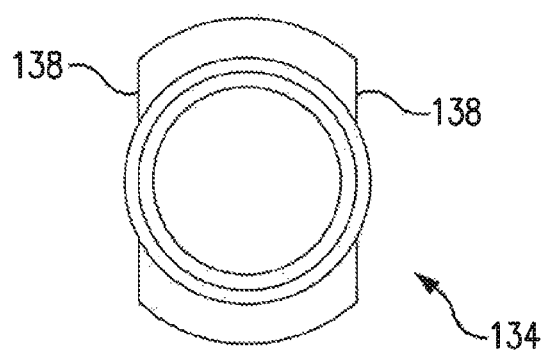
FIG. 8 is an end view of the inlet nipple of FIG. 3, showing the end flange with anti-rotation flats.

An inlet nipple 134 is connected in fluid communication with drain passage inlet 118. Inlet nipple 134 includes a straight conduit 136. The mounting gland for inlet nipple 134 is part of the first and second fairing portions 102 and 108. Inlet nipple 134 is bonded to the first and second fairing portions 102 and 108, and these three components become one solid piece. As shown in FIG. 8, inlet nipple 134 includes an end flange with flats 138. The mounting gland of inlet 118 includes a double d structure, wherein the flat sides, i.e., anti-rotation dogs 139, thereof are substantially equal to the tube diameter of inlet nipple 134. Flats 138 and dogs 139 cooperate to resist any rotation loads on inlet nipple 134 to minimize the chance of breaking the bond. FIG. 4 shows another exemplary embodiment of an inlet nipple 234 that can be used in lieu of inlet nipple 134. Inlet nipple 234 is similar to inlet nipple 134 except that conduit 236 is bent. FIG. 5 shows yet another exemplary inlet nipple 334 similar to inlet nipple 134 except that conduit 336 has a different type of interface 337 wherein the seal members are at the inlet end of conduit 336. The different inlet nipples 134, 234, and 334 of FIGS. 3-5 are shown to demonstrate the interchangeability of inlet nipples used with drain mast 100. This can allow drain mast 100 to be adapted to connect with any suitable drain interface, and those skilled in the art will readily appreciate that any other suitable type of inlet nipple can be used without departing from the scope of this disclosure. Inlet nipples 134, 234, and 334 can be made of G-10 fiberglass loaded epoxy, for example, or of any other suitable material.

With continued reference to FIG. 3, a first void 140 is defined within fairing 114 between drain passage 116 and leading edge 126, with portions of first and second fairing walls 104 and 110 and the mounting flange also bounding void 140. A second void 142 is defined within fairing 114 between drain passage 116 and trailing edge 128, with portions of first and second fairing walls 104 and 110 and the mounting flange also bounding void 142. First void 140 is in fluid communication with the space exterior to fairing 114 through a vent 144 defined in fairing 114. Similarly, second void 142 is in fluid communication with the space exterior to fairing 114 through a vent 146 defined in the fairing. Vents 144 and 146 allow voids 140 and 142 to equalize pressure as fairing 114 is exposed to varying external pressures, as in a climbing and descending aircraft.

Figure 6:
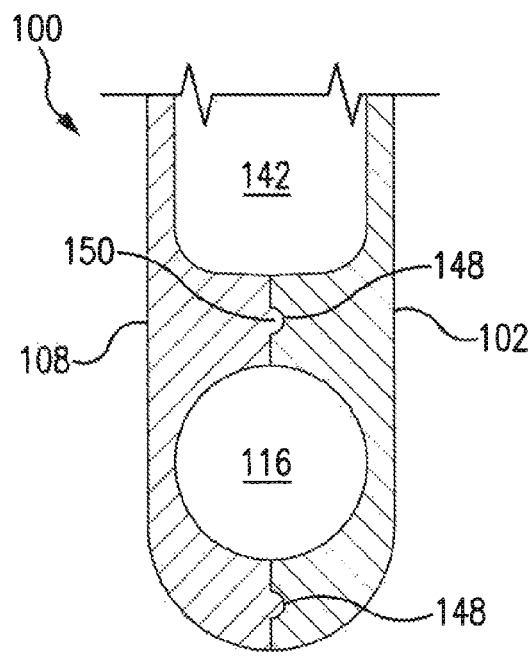
FIG. 6 is a cross-sectional end elevation view of a portion of the drain mast of FIG. 1 taken at the corresponding cross-section indicated in FIG. 3, showing the tongue and grove engagement of the first and second fairing bodies.

With reference now to FIG. 6, the cross section 6-6 of drain mast 100 indicated in FIG. 3 is shown. A portion of the first fairing body 102 includes a groove 148, and a portion of second fairing body 108 includes a tongue 150 engaged with groove 148. Tongue and groove 148 and 150 substantially surround void 142, as indicated in FIG. 3. A similar tongue and groove substantially surrounds void 140. The tongue and groove elements of first and second fairing bodies 102 and 108 are an exception to their substantial mirrored symmetry, and this configuration provides resistance to relative sliding of first and second fairing bodies 102 and 108 during assembly, as well as resistance to shearing along seam 124 when drain mast 100 is completely assembled.

Figure 7:
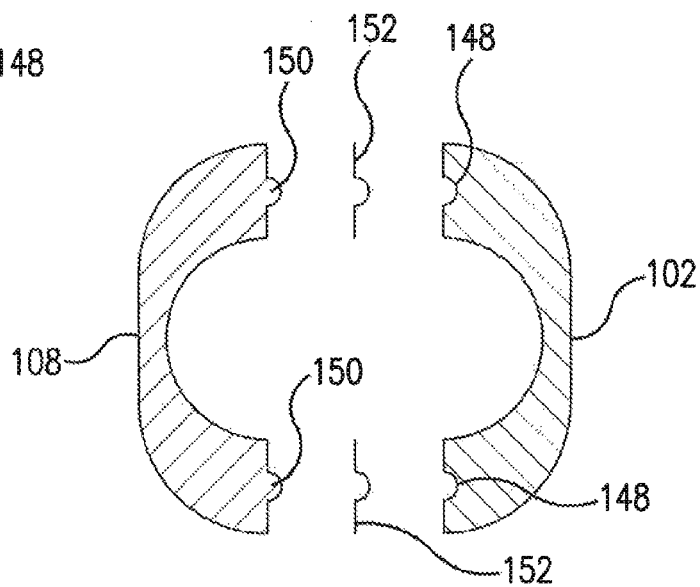
FIG. 7 is an exploded cross-sectional end elevation view of a portion of the drain mast of FIG. 1 taken at the corresponding cross-section indicated in FIG. 3, showing the tongue and grove engagement of the first and second fairing bodies.

Referring now to FIG. 7, the cross-section 7-7 of drain mast 100 indicated in FIG. 3 is shown, with first and second fairing bodies 102 and 108 shown separated. Also schematically shown is adhesive 152 used to join first and second fairing bodies 102 and 108. It is contemplated that first and second fairing bodies 102 and 108 can be entirely non-metallic, e.g. compression molded using a sheet molding compound (SMC), Michigan, and that adhesive 152 can be a structural grade epoxy, for example. Those skilled in the art will readily appreciate that these materials are exemplary only, and that any other suitable materials and joining techniques can be used without departing from the scope of this disclosure. For example, it is possible that a metallic fairing could be constructed in accordance with this disclosure wherein the joining is accomplished by brazing. However for the following description of a method of assembly, the exemplary context of fiberglass and epoxy is used.

An exemplary method of making a drain mast, e.g., drain mast 100, includes joining a first fairing body, e.g. first fairing body 102 as described above, to a second fairing body, e.g., second fairing body 108 as described above, to form a fairing, e.g., fairing 114 described above. An inlet nipple, e.g., inlet nipples 134, 234, and 334 described above, can be joined to the fairing in fluid communication with the drain passage inlet, e.g. drain passage inlet 118. Joining the first fairing body to the second fairing body can include applying an adhesive, e.g., adhesive 152 which can be an epoxy, to at least one of the first and second drain portions, and adhering the first and second fairing bodies together with the adhesive. Joining the fairing bodies in this manner forms a pressure tight, fluid tolerant drainage tube flow path, e.g., drain passage 116 is pressure tight relative to voids 140 and 142, and is pressure tight along its length from drain passage inlet 118 to drain passage outlet 120.

In particular, the epoxy can be applied to the tongue and groove portions of the first and second fairing bodies. Epoxy can also be applied to any other seam portions of the first and second fairing bodies. If vents, e.g., vents 144 and 146, are included, care should be used to prevent blockage of the vents when applying the epoxy. With the epoxy applied, the first and second fairing bodies can be clamped together for curing of the epoxy. The inlet nipple can be joined to the fairing using the same epoxy after the first and second fairing bodies are joined, or the inlet nipple can be mounted with epoxy to one of the fairing bodies prior to assembling the fairing bodies together. The inlet nipple could also be sealed to an airframe first, and then the drain mast could be pushed onto inlet nipple. In the foregoing manner, a drain mast is formed with the drain tube as an integral part of the airfoil. The inlet nipple can be removed and replaced without disassembling the fairing.

A potential advantage of building the fairing airfoil with an integral drain tube is that the width component of the airfoil, e.g., the width of the drain mast as viewed in FIG. 6, and the resultant drag can be reduced compared to conventional designs, since the fairing wall is used as part of the drain tube wall. In another aspect of this potential advantage, with an integral drain tube as disclosed herein, no tube to fairing wall clearance is needed. An integral drain tube also provides the potential advantages of lower part count and cost of manufacture.

While shown and described in the exemplary context of drains for aircraft, those skilled in the art will readily appreciate that drain masts in accordance with this disclosure can be used in any other suitable application.

The methods and systems of the present disclosure, as described above and shown in the drawings, provide for drain masts with superior properties including ease of manufacture and repair as well as the potential for reduced drag. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A drain mast comprising:
   a first fairing body defining a first fairing wall and a first drain portion; and
   a second fairing body defining a second fairing wall and a second drain portion, wherein the first and second fairing bodies are joined together as a fairing with the first and second fairing walls as opposed exterior fairing walls, and with the first and second drain portions joined to form a drain passage through the fairing from a drain passage inlet to a drain passage outlet,
   wherein the first drain portion includes a first drain channel defined by sidewalls extending from the first fairing wall, wherein the second drain portion includes a second drain channel defined by sidewalls extending from the second fairing wall, and wherein the first and second drain channels are joined defining the drain passage between the first and second drain channels,
   wherein the opposed exterior fairing walls define an airfoil from a leading edge of the fairing to a trailing edge of the fairing, wherein the opposed exterior fairing walls are joined to one another at a seam along the leading and trailing edges of the fairing.

2. The drain mast as recited in claim 1, further comprising an inlet nipple connected in fluid communication with the drain passage inlet.

3. The drain mast as recited in claim 1, wherein the first fairing body includes a first mounting flange portion, wherein the second fairing body includes a second mounting flange portion, and wherein the first and second mounting flange portions are joined together as a mounting flange surrounding the drain passage inlet for mounting the fairing to an aircraft.

4. The drain mast as recited in claim 1, wherein the first and second fairing bodies are substantially symmetrical across a plane defined by a seam where the first and second fairing bodies are joined together.

5. The drain mast as recited in claim 1, wherein the first and second fairing bodies are non-metallic, and are joined together by an adhesive.

6. The drain mast as recited in claim 5, wherein the first and second fairing bodies are fiberglass, and wherein the adhesive is an epoxy.

7. The drain mast as recited in claim 1, wherein the fairing defines opposed leading and trailing edges, wherein a first void is defined within the fairing between the drain passage and the leading edge, and wherein a second void is defined within the fairing between the drain passage and the trailing edge.

8. The drain mast as recited in claim 7, wherein the first void is in fluid communication with a space exterior to the fairing through a vent defined in the fairing.

9. The drain mast as recited in claim 7, wherein the second void is in fluid communication with a space exterior to the fairing through a vent defined in the fairing.

10. The drain mast as recited in claim 1, wherein a portion of the first fairing body includes a groove, and wherein a portion of the second fairing body includes a tongue engaged with the groove of the first fairing body.

11. A method of making a drain mast comprising:
    joining a first fairing body to a second fairing body to form a fairing, wherein the first fairing body defines a first fairing wall and a first drain portion including a first drain channel defined by sidewalls extending from the first fairing wall, wherein the second fairing body defines a second fairing wall and a second drain portion including a second drain channel defined by sidewalls extending from the second fairing wall, wherein the first and second fairing walls form opposed exterior fairing walls, wherein the first and second drain portions form a drain passage through the fairing from a drain passage inlet to a drain passage outlet, and wherein the opposed exterior fairing walls define an airfoil from a leading edge of the fairing to a trailing edge of the fairing, wherein the opposed exterior fairing walls are joined to one another at a seam along the leading and trailing edges of the fairing.

12. The method as recited in claim 11, further comprising joining an inlet nipple to the fairing in fluid communication with the drain passage inlet.

13. The method as recited in claim 11, wherein joining the first fairing body to the second fairing body includes applying an adhesive to at least one of the first and second drain portions, and adhering the first and second fairing bodies together with the adhesive.

* * * * *